United States Patent [19]

Wahlmann et al.

[11] 4,063,776
[45] Dec. 20, 1977

[54] VEHICLE SEATS

[75] Inventors: Ernst Wahlmann, Volksdorf; Willi Schöttker, Nordsehl, both of Germany

[73] Assignee: P.A. Rentrup, Hubbert & Wagner Fahrzeugausstattungen GmbH & Co. KG, Germany

[21] Appl. No.: 702,123

[22] Filed: July 2, 1976

[30] Foreign Application Priority Data

July 5, 1975 Germany .............................. 2530082
Sept. 29, 1975 Germany .............................. 2543357
Feb. 14, 1976 Germany .............................. 2605963

[51] Int. Cl.² .............................................. A47C 1/024
[52] U.S. Cl. ..................................... 297/361; 297/362
[58] Field of Search ................ 297/313, 319, 325-328, 297/354, 355, 361, 362, 366, 374, 378, 379; 248/371, 379; 108/6, 7

[56] References Cited

U.S. PATENT DOCUMENTS

| 3,044,830 | 7/1962 | Kolle | 297/361 |
| 3,441,313 | 4/1969 | Persson | 297/374 |
| 3,635,525 | 1/1972 | Magyar | 297/354 |

FOREIGN PATENT DOCUMENTS

| 1,304,732 | 8/1962 | France | 297/361 |
| 938,050 | 1/1956 | Germany | 297/355 |
| 1,239,201 | 4/1967 | Germany | 297/361 |
| 1,946,041 | 4/1971 | Germany | 297/313 |
| 1,281,845 | 7/1972 | United Kingdom | 297/361 |

Primary Examiner—Roy D. Frazier
Assistant Examiner—William E. Lyddane
Attorney, Agent, or Firm—Larson, Taylor and Hinds

[57] ABSTRACT

A seat for an automobile or other vehicle includes a seat part and an adjustable back-rest part. The two parts are connected pivotally by a linkage which includes an eccentric disc having a large ratio of diameter to thickness. The disc engages in a recess in the back-rest part and is mounted on the seat part for rotation whereby the inclination of the two parts can be adjusted without relative translational movement between the two parts.

2 Claims, 10 Drawing Figures

VEHICLE SEATS

BACKGROUND OF THE INVENTION

1. Field of the Invention

The invention relates to linkages for seats having inclination adjustment, in particular for vehicle seats.

2. Summary of the prior art

German Gebauchsmuster No. 7,031,179 discloses linkages in which one link part is fixedly mounted on a seat part and another link part is pivotable in accordance with the inclination, the parts being interconnected by a pivot pin. An adjustment and fixing arrangement is provided for both linkage parts in which one link part is secured to an internal annular hear and the oher link part is secured to a spur gear meshing with it, the addendum circle of the spur gear being smaller by the height of one tooth than the dedendum circle of the internal annulus gear. The link part associated with the seat part is mounted eccentrically on the pivot axis formed as a pin, the eccentricity corresponding substantially to the diameter of the pin and of which the ratio of thickness to diameter is relatively small. The eccentricity of this eccentric, rotatable by means of a hand grip, corresponds substantially to the difference between the dedendum circle of the internal annulus gear on the one hand and the addendum of the spur gear on the other hand and is so dimensioned that a self-jamming between the internal annulus gear and the spur wheel is produced. The internal free space of the internal annulus gear receives a bridging member which provides an integral bearing for the eccentric. The link part supported about the pivot axis by the gear parts is thus surrounded with a gear part of the other link and is integral with the corresponding gear part opposite to the side of the pivot axis and carrying a bearing housing.

The linkage has several disadvantages. A particular disadvantage lies in the exceptionally costly manufacture of the individual constructional parts, in particular the two link parts, as well as the eccentric pin.

An object of the present invention is therefore so to produce a linkage that the cost of the individual constructional parts is reduced to a minimum.

SUMMARY OF THE INVENTION

According to the present invention there is provided in a seat, means defining a seat part, means defining a back rest part, and linkage means interconnecting the seat part and the back rest part to enable adjustment of the inclination of the seat part and back rest, said linkage means comprising a part rigid with the seat part, a part rigid with the back rest part and having a recess therein, a rotatable eccentric disc having a large ratio of diameter to thickness and an operational surface which is complementary to and engages in the recess of said part rigid with the back rest, and a slide member in which the eccentric disc is mounted and which is itself slidably mounted in the link part rigid with the seat part by the provision of a slide member, which is slidably guided in an opening or recess in one link part, it is ensured that the back-rest executes only a pivotal movement, a translational movement of the back rest as a result of operation of the eccentric thus being prevented under all conditions. The displacement inevitably associated with operation of an eccentric takes place upwardly and downwardly, but by the provision of the slide member movable in the recess or opening in one of the link parts, the displacement is not transmitted to the back rest as such. The recess or opening in the one link part and the slide member movably guided therein thus form a so-called lost-motion which prevents under all conditions movement of the back rest upwardly and downwardly during its pivotal movement relative to the seat part. It follows that there is no relative movement between the back of the seat user on the one hand and the back rest on the other hand.

According to a further embodiment of the invention the eccentric carries an annulus gear or segment gear at its periphery which meshes with a pinion rotatable by a hand grip and is mounted in the link part. Each eccentric has a stamped out opening of polygonal form in which a complementary shaft engages to connect the two eccentrics.

DESCRIPTION OF THE PREFERRED EMBODIMENTS

Figure 1:
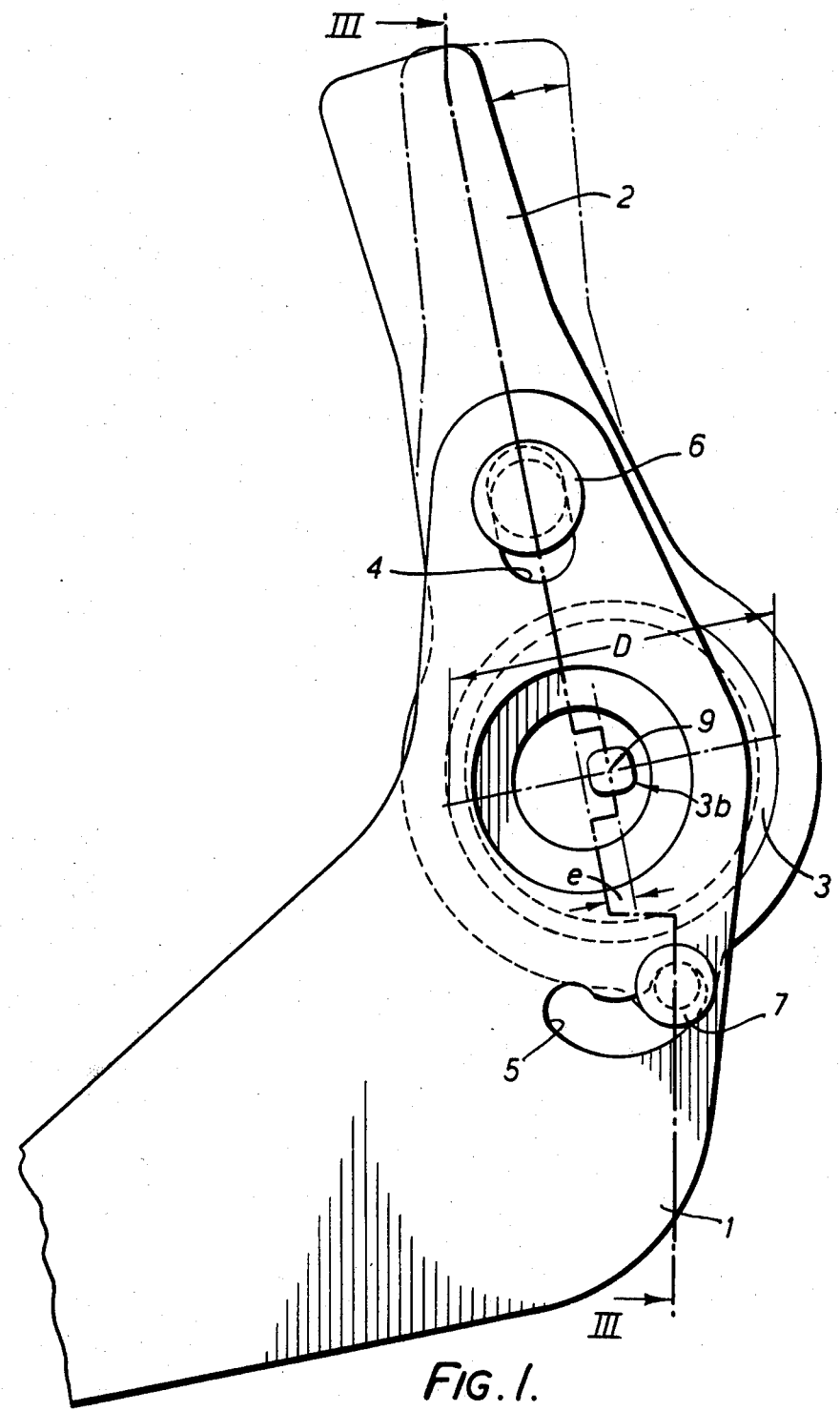
FIG. 1 is a fragmentary view of one embodiment of the linkage in accordance with the invention in one extreme adjustment position.

Like parts are given the same reference numerals in each embodiment.

Figure 2:
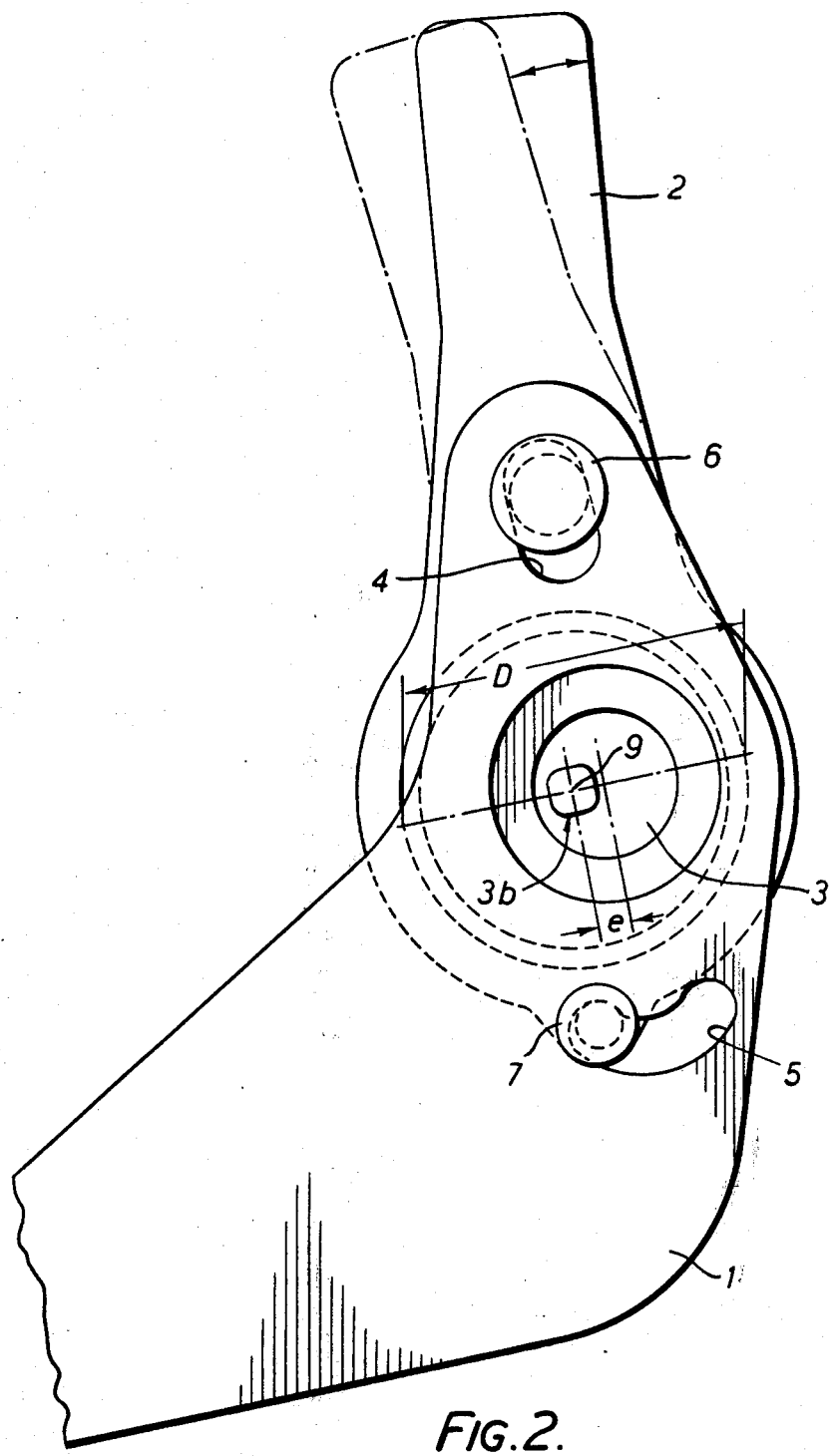
FIG. 2 is a fragmentary view of the linkage of FIG. 1 in the other extreme position.
Figure 3:
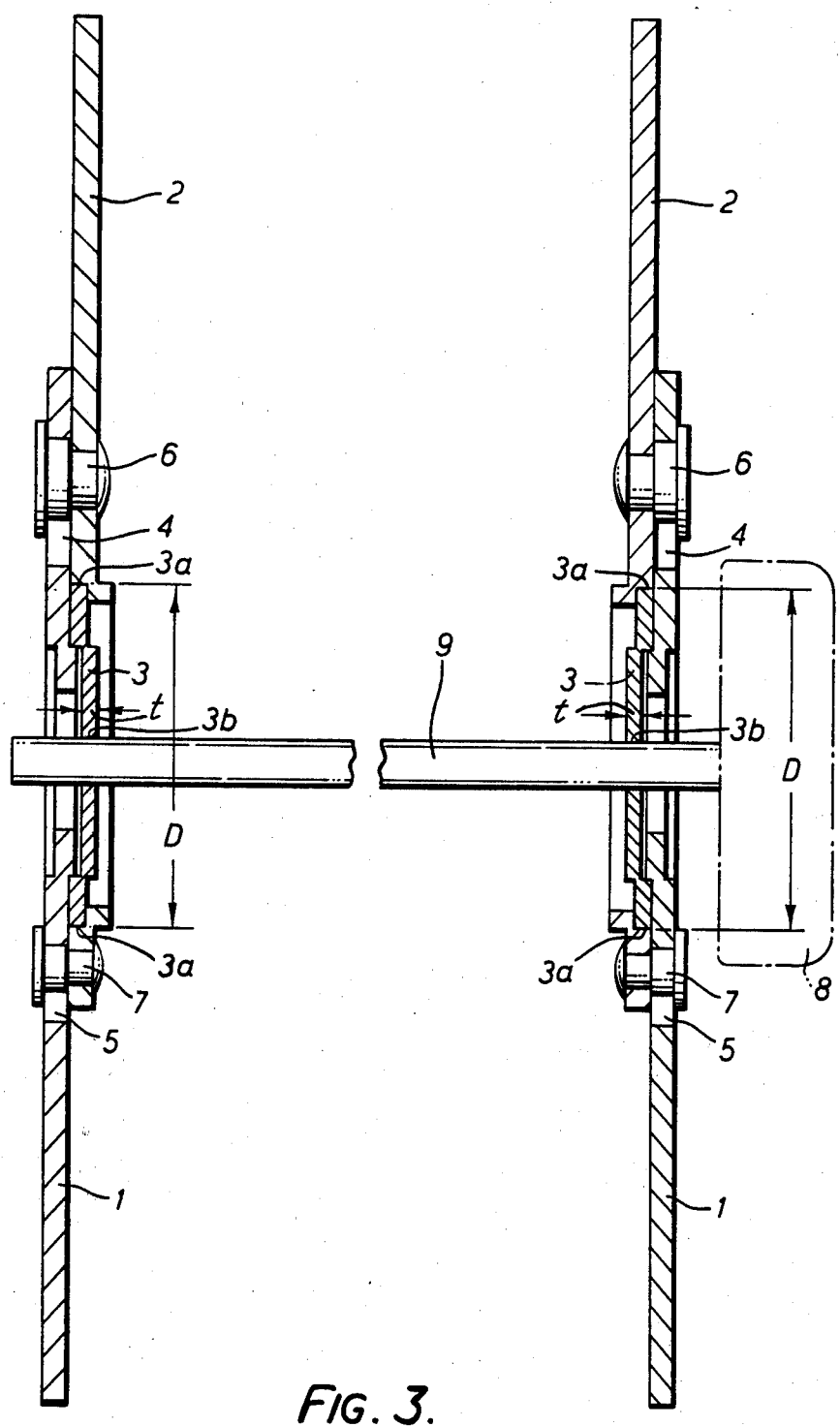
FIG. 3, is a section on line III—III of FIG. 1, also showing the corresponding linkage on the opposite side of a seat in which the linkages are incorporated.

Referring now to FIGS. 1 to 3, the linkage consists of a link part 1, which is connected to the seat part (not shown) of a vehicle seat and by means, which for the sake of clarity are not further illustrated, for example, of screws or the like. The link part 1 is locally fixed to the seat part and therefore its position is not adjustable relative to that seat part.

A link part 2 co-operates with the link part 1, which is associated with the back rest, (not shown) and is connected therewith in any suitable manner.

Both link parts 1 and 2 are preferably produced by stamping and are therefore inexpensive to manufacture. In this way machining operations are limited.

The reference numeral 3 indicates an eccentric in the form of a flat disc. The diameter/thickness ratio of this disc is extremely large, so that the thickness $t$ of this eccentric disc 3 in relation to the diameter D is practically negligible. The eccentric disc 3 is likewise manufactured as a stamped part.

The eccentricity of the eccentric disc is indicated by e in FIGS. 1 and 2.

The peripheral, operative, surface 3a is engaged in a complementary recess in the link part 2. As a result of the comparatively large diameter D of the eccentric disc 3 the operative surface 3a is also corresondingly large so that the specific pressure and therefore the stressing of this part is very small.

Two slots or other recesses 4, 5 are formed in the link part 1 which are engaged by respective pins 6, 7 which are supported in the link part 2. These slots 4, 5 and pins 6, 7 are shown in two extreme positions of the link part 2 fixed to the back rest, namely the sitting position in FIG. 1 and the resting or reclining position in FIG. 2. By variation in the lengths of the slots 4, 5 the pivot stroke of the link part 2 and thus of the back rest can be corresondingly varied.

An aperture 3b is cut in the eccentric 3 which has in cross-section a polygonal form for example four sides, as shown, in which is engaged a generally square-section shaft 9, rotatable by hand grip 8 (phantom lines).

The manner of operation of the linkage of FIGS. 1 to 3 will now be described:

In the sitting position, the individual parts lie in the positions illustrated in FIG. 1 of the drawing. If the back rest is to be moved into the rest (reclining) position, that is in the position illustrated in FIG. 2 of the drawings, then the eccentric disc 3 is turned by the hand grip 8, by which a pivotal movement of both linkage parts 2 is effected into the position illustrated in FIG. 2. Further rotation of the hand grip 8 is prevented, since the two pins 7 and 8 come into positive abutment with the outermost ends of the slots 4 and 5.

In the embodiment of FIGS. 4 to 7, the eccentric is mounted in a slide member 10, guided in a rectangular aperture 11 in the linkage part 1. Openings 12 and 13 are provided respectively in both of the linkage parts 1, 2 and receive connecting pins 14 which pass through both openings. By the arrangement of the slidably guided slide member 10 no translational movement whatsoever can take place of the link parts 2 and so the back rest does not move upwardly and downwardly during the pivotal adjusting movement; the part 2 thus executes only a pivotal movement so that the relative movement between the back of the seat user and the back rest is prevented.

The slot or other recess 5 of this embodiment is provided in the link part 2, in which the pin 7 engages. These two parts 5, 7 together define the two extreme positions as in the first embodiment, namely the sitting position on the one hand and the rest (or reclining) position on the other hand, of the link part 2 rigid with the back rest (FIG. 4 and 5).

Figure 4:
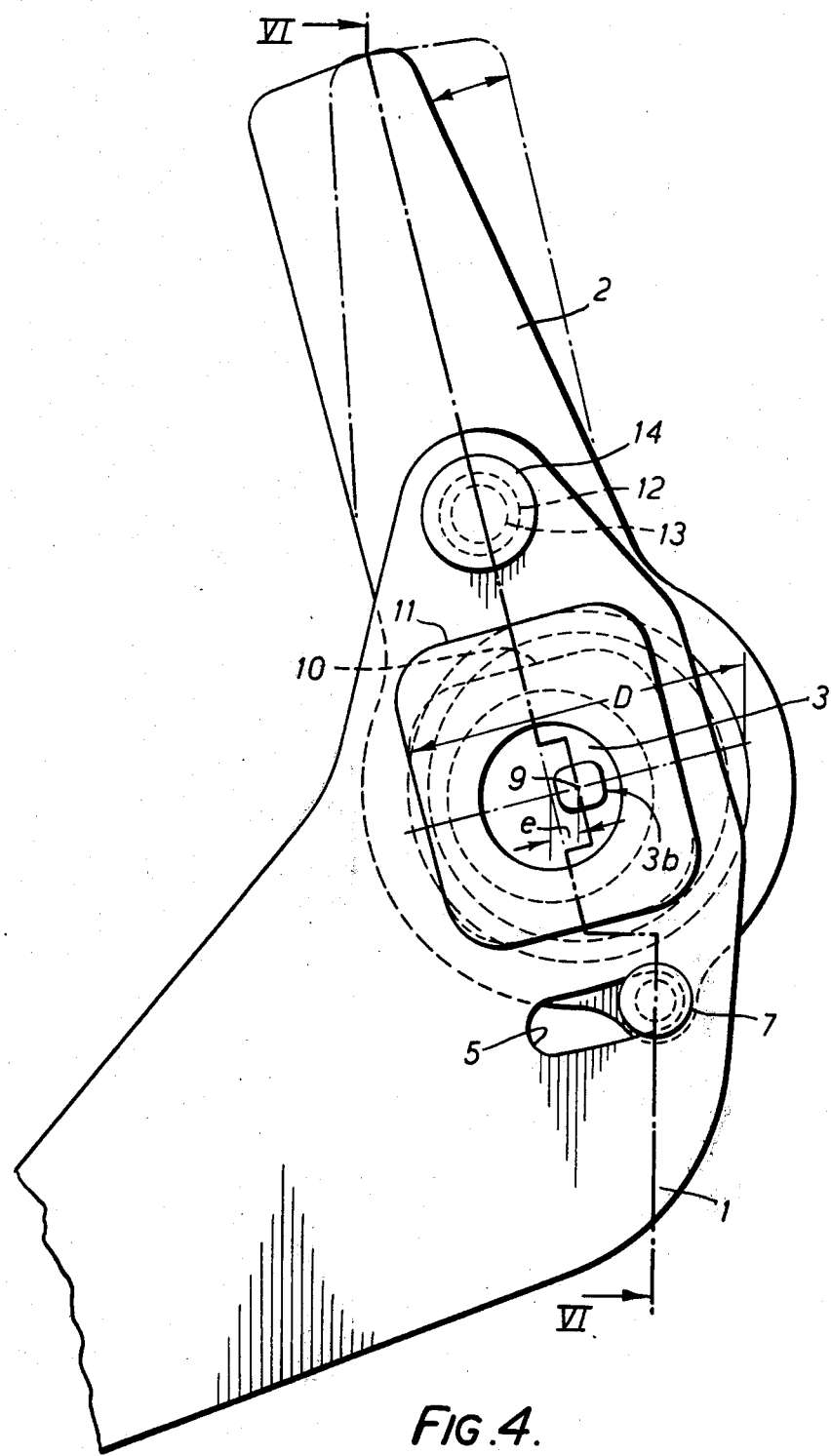
FIG. 4 is a fragmentary view of another embodiment of linkage in accordance with the invention in one extreme position.
Figure 5:
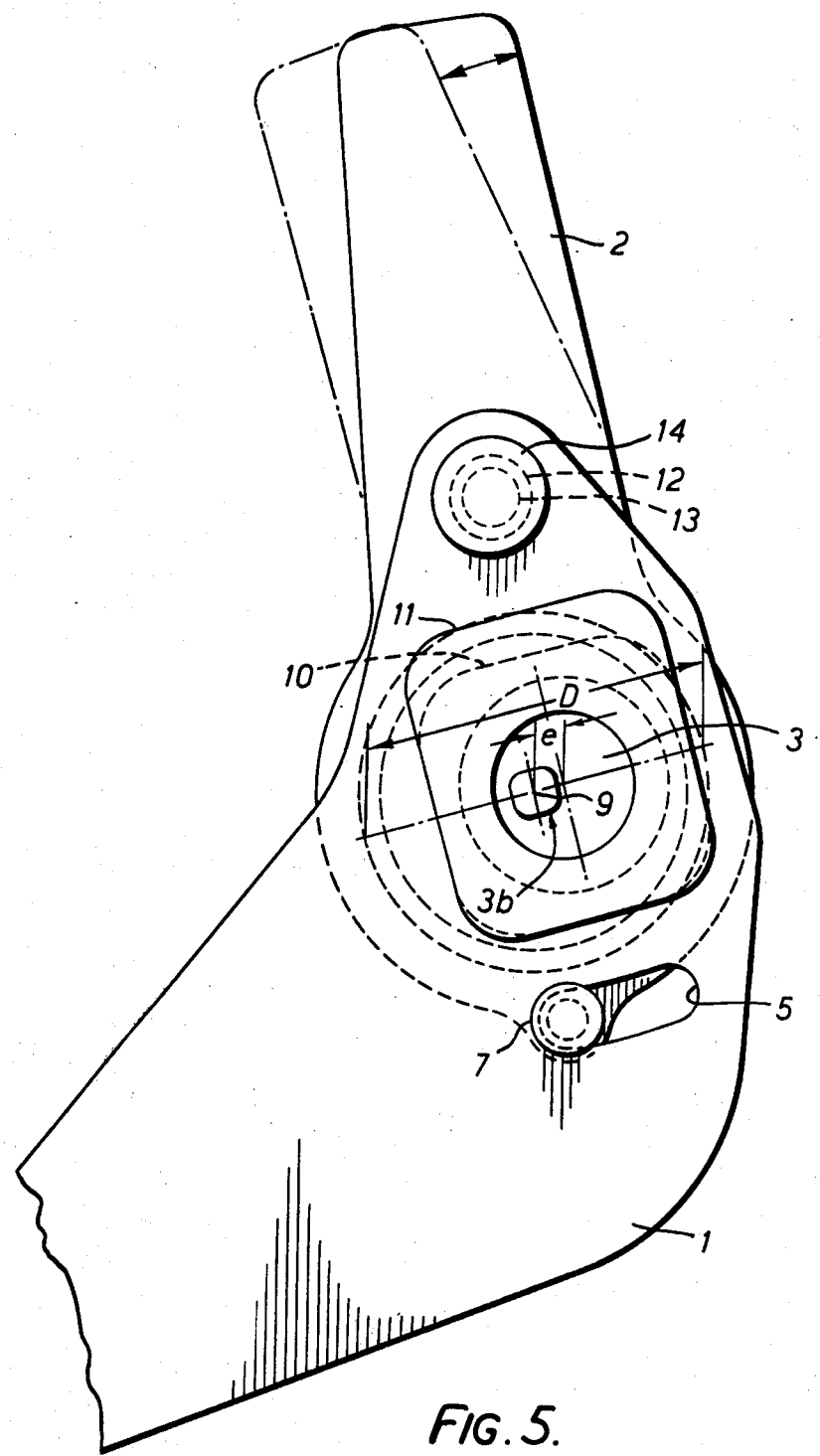
FIG. 5 is a fragmentary view of the linkage of FIG. 4 in the other extreme position.
Figure 6:
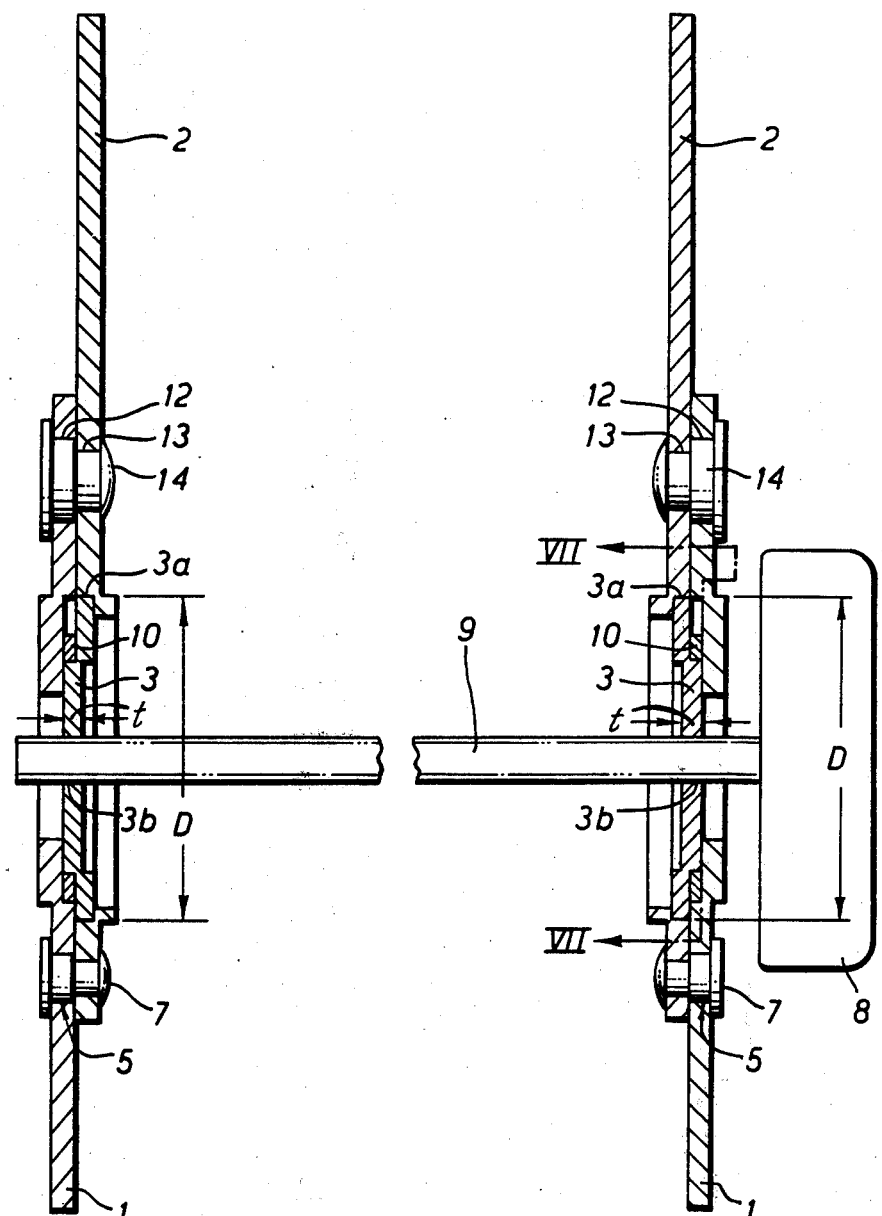
FIG. 6, is a vertical section along the line VI—VI of FIG. 4, also showing the corresponding linkage on the opposite side of a seat in which the linkages are incorporated.
Figure 7:
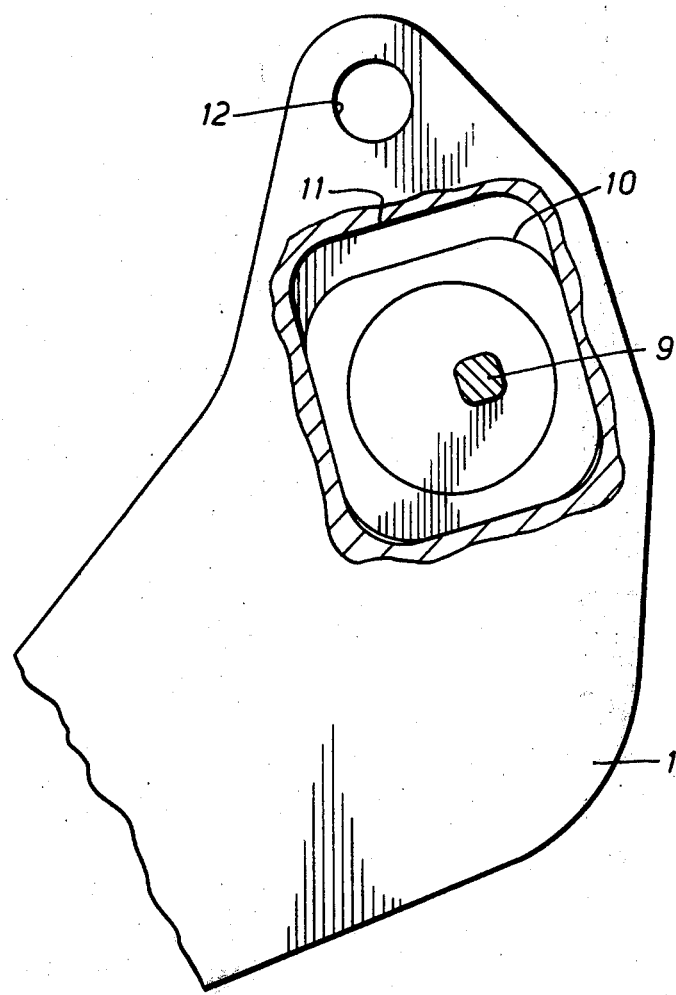
FIG. 7 is a view in the direction of the section line VII—VII of FIG. 6.

The manner of operation of the linkage of the second embodiment is as follows:

In the sitting position, the individual parts assume the relationship illustrated in FIG. 4 of the drawing. If the back rest is to be pivoted into the rest (or reclining) position, that is into the position illustrated in FIG. 5 of the drawing, the eccentric disc 3 is turned by the hand grip 8, as a result of which pivoting of the linked parts 2 is effected into the position illustrated in FIG. 5. It is essential that the link part 2 and thereby the back rest carry out only a pivotal movement, so that no translational movement whatsoever is effected either upwardly or downwardly by the back rest. This feature is the direct result of the slide member 10 being slidably guided in the rectangular aperture 11, which takes up this translational movement without however transmitting it to the linkage part 2. The slide member 10 and the aperture 11 thus have the effect of providing a lost motion. Further rotation of the hand grip 8 is prvented by the pin 7 positively abutting against the outermost ends of the slots 5.

Figure 8:
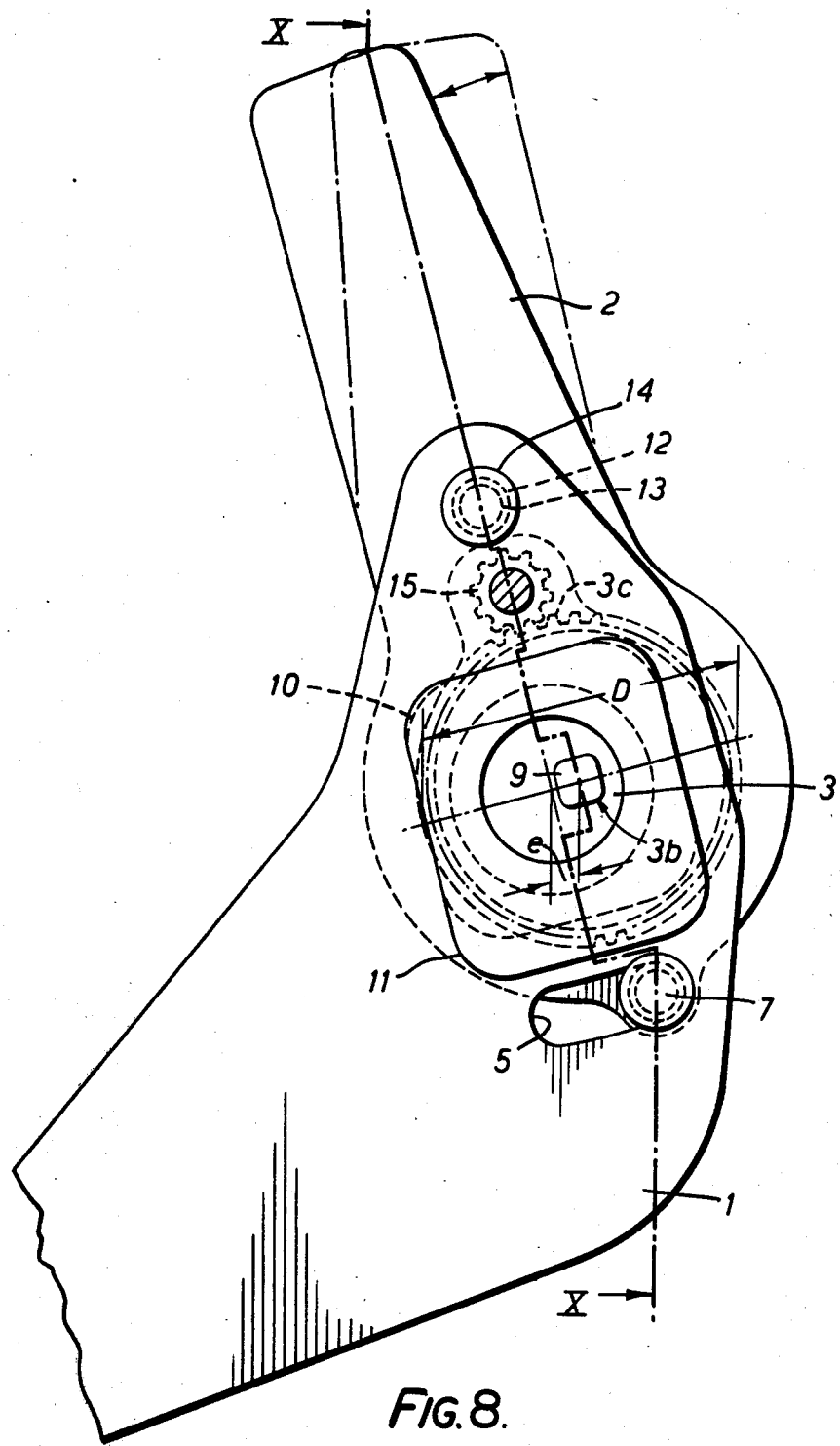
FIG. 8 is a fragmentary view of a third embodiment of linkage in accordance with the invention in one extreme position.
Figure 9:
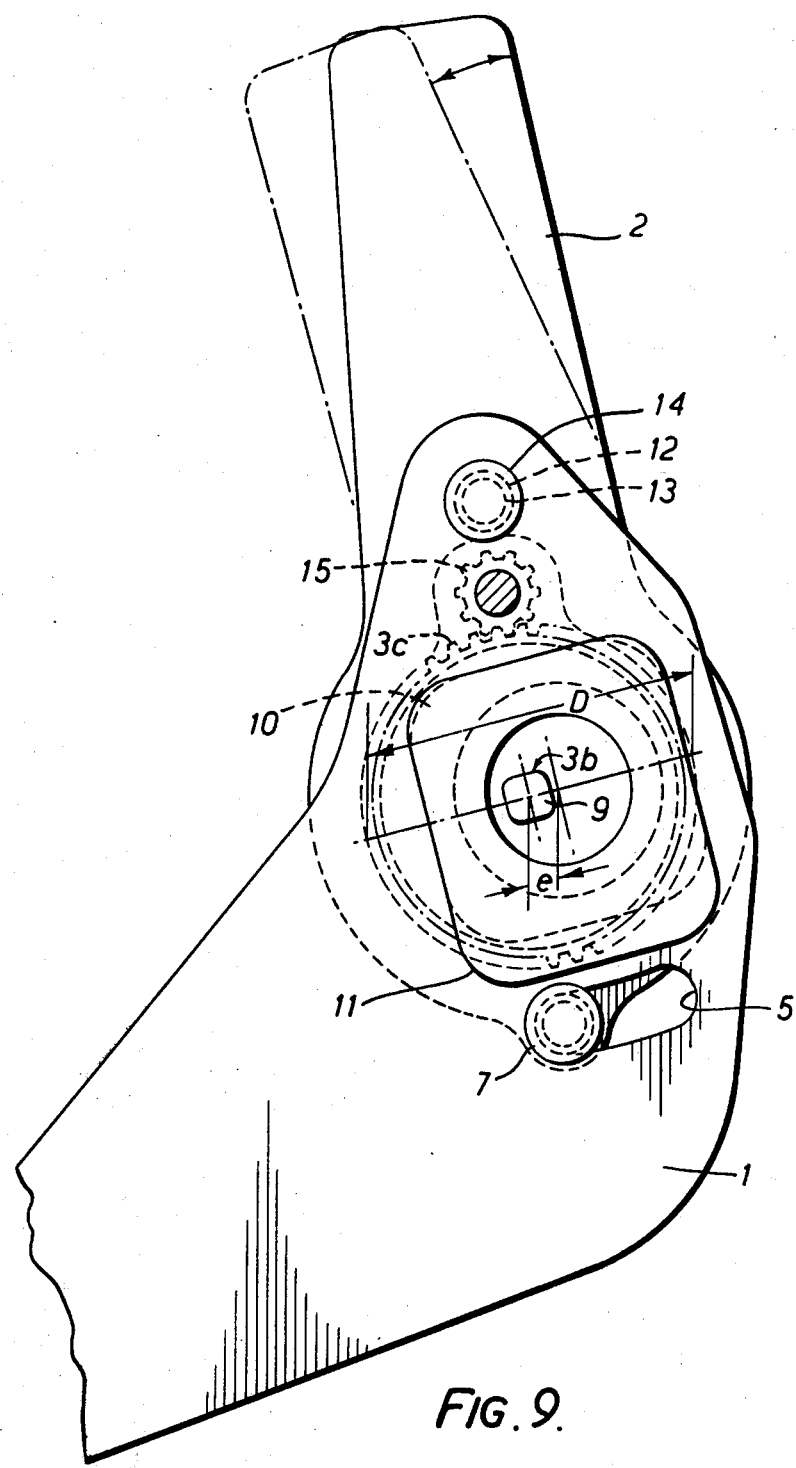
FIG. 9 is a fragmentary view of the linkage of FIG. 8 in the other extreme position.
Figure 10:
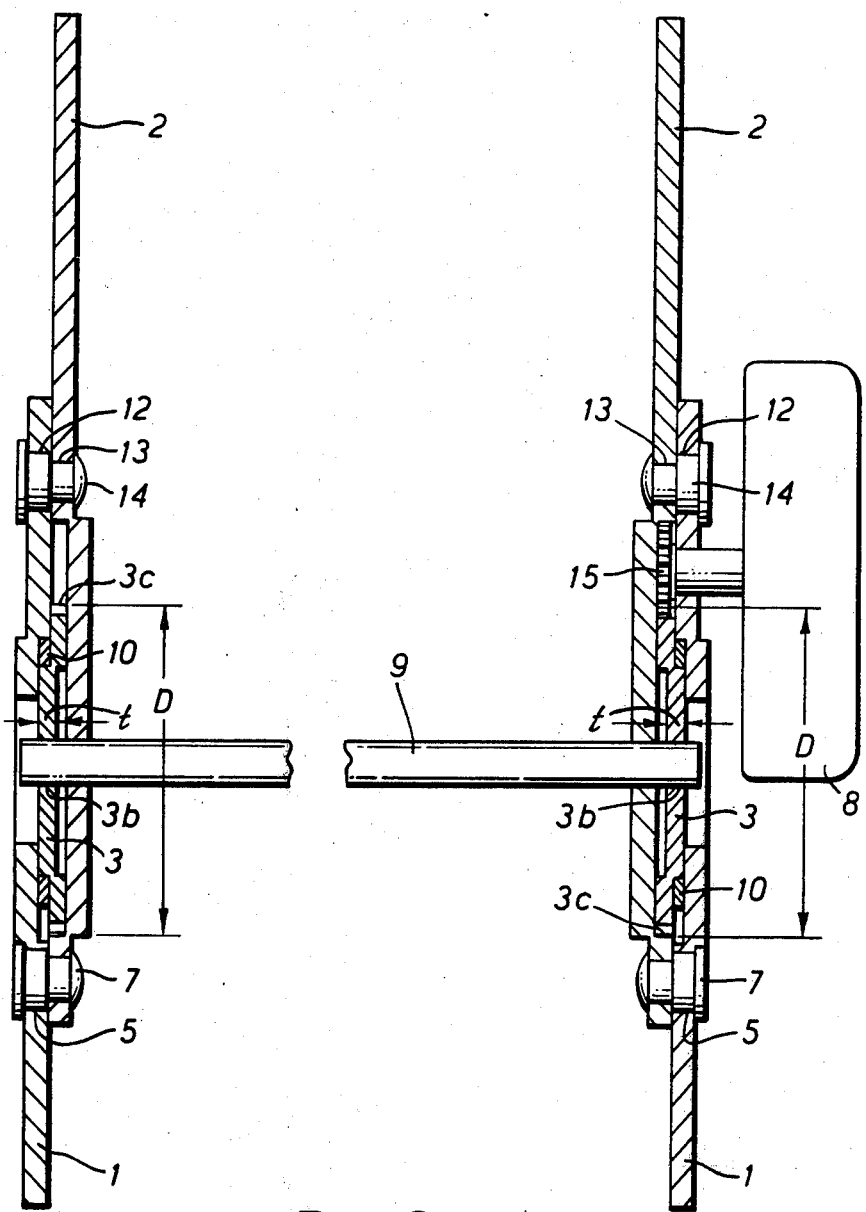
FIG. 10 is a vertical section along the line X—X of FIG. 8, also showing the corresponding linkage on the opposite side of a seat in which the linkages are incorporated.

In the third embodiment, illustrated in FIGS. 8 to 10, an annulus gear 3c or segment gear is mounted on the periphery of the eccentric disc 3, and meshes with a pinion 15 which is mounted in the link part 1 and is rotatable by the hand grip 8. By rotation of the pinion 15 with the hand grip 8, the eccentric 3 is rotated in an anti-clockwise sense. A four-sided cut-out 3b is formed in each eccentric disc 3, and a shaft 9 of corresponding cross-section engages in each cut-out 3b to connect the two eccentrics 3, (FIG. 10).

The manner of operation of the linkage of the embodiment of FIGS. 8 to 10 is as follows:

In the sitting position individual parts assume the positions illustrated in FIG. 8 of the drawing. If the back rest is to be moved into the rest position as is illustrated in FIG. 9, then the eccentric disc 3 is turned through the hand grip 8 and the pinion 15 as well as the annulus gear 3c as a result of which pivotal movement of the linkage part 2 into the FIG. 9 position is effected. The linkage part 2 and the associated back rest carry out only a pivotal movement, so that no translational movement whatsoever occurs in the plane of the front face of the back rest either upwardly or downwardly. This is the direct result of the slide member 10 being slidably guided in the aperture 11, which is subjected to this translation movement, without however, transmitting it to the linkage part 2. The slide 10 and the recess 11 thus provide for lost motion.

Further rotation or turning of the hand grip 8 is prevented when the pins 7 positively abut against the outermost end of the slots 5.

By the construction of the eccentric disc as a flat disc and the mounting of it in the link part associated with the back rest as well as by a complete omission of toothed rings in both link parts, the manufacturing costs can be reduced.

In addition, special inserts in the link parts are reduced to a minimum. Moreover, the linkage is suitable or inexpensive mass production, and this exceptionally favourable to the overall manufacturing costs. Despite the overall far-reaching simplification in the construction and in the operational use, strength and long life of the linkage is in no way adversely affected.

Furthermore, the power consumption of this linkage fitting is favourable. Self-locking is provided by use of comparatively large operational or working faces of the eccentric disc, enabling the specific pressure and the stress to be kept very small.

The linkages in accordance with the invention are adjustable with comparatively small forces.

We claim:
1. In a seat,
means defining a seat part,
means defining a back rest part, and
linkage means interconnecting the seat part and the back rest part to enable pivotal adjustment of the inclination of the seat part relative to the back rest part, said linkage means comprising
a part rigid with the seat part,
a part rigid with the back rest part and having a recess therein, a rotatable eccentric disc having a large ratio of diameter to thickness and an operational surface which is complementary to and engages in the recess of said part rigid with the back rest part, and a slide member in which the eccentric disc is mounted and which is itself slidably mounted in the part rigid with the seat part.

2. A seat according to claim 1, comprising two said linkage means, one said linkage means further comprising an annulus gear co-axial with the geometric centre of the eccentric disc and secured on the periphery of the eccentric disc, a hand grip, and a pinion mounted on the part rigid with the seat part, mounted for rotation with the hand grip and meshing with the annulus gear, the seat further comprising a shaft of polygonal cross-section, each eccentric disc having an aperture of complementary cross-section to the shaft and the eccentric discs being interconnected by engagement of the shaft in the complementary apertures whereby rotation of the hand grip of the one linkage will rotate the pinion and the annulus gear of that linkage and the rotation will be transmitted to the other linkage by the polygonal shaft.

* * * * *